(12) United States Patent  
Veneman

(10) Patent No.: US 11,626,771 B2
(45) Date of Patent: Apr. 11, 2023

(54) ROTATIONAL MOTOR

(71) Applicant: Ricky Harman Veneman, Glen Iris (AU)

(72) Inventor: Ricky Harman Veneman, Glen Iris (AU)

(*) Notice: Subject to any disclaimer, the term of this patent is extended or adjusted under 35 U.S.C. 154(b) by 122 days.

(21) Appl. No.: 17/420,030

(22) PCT Filed: Jan. 13, 2020

(86) PCT No.: PCT/AU2020/000004
§ 371 (c)(1),
(2) Date: Jun. 30, 2021

(87) PCT Pub. No.: WO2020/146918
PCT Pub. Date: Jul. 23, 2020

(65) Prior Publication Data
US 2022/0052580 A1  Feb. 17, 2022

(30) Foreign Application Priority Data

Jan. 14, 2019 (AU) ................................ 2019900105

(51) Int. Cl.
*H02K 16/02* (2006.01)
*H02K 7/02* (2006.01)
*H02J 3/30* (2006.01)
*H02K 1/22* (2006.01)

(52) U.S. Cl.
CPC .............. *H02K 7/025* (2013.01); *H02J 3/30* (2013.01); *H02K 1/223* (2013.01); *H02K 16/02* (2013.01)

(58) Field of Classification Search
CPC .......... H02K 1/27; H02K 1/273; H02K 16/02
See application file for complete search history.

(56) References Cited

U.S. PATENT DOCUMENTS

| | | | | |
|---|---|---|---|---|
| 2,968,755 A * | 1/1961 | Baermann | ............. | H02K 25/00 318/400.41 |
| 6,657,353 B1 * | 12/2003 | Patarchi | ................. | H02K 21/12 310/49.32 |
| 6,756,870 B2 * | 6/2004 | Kuwahara | ............. | H02K 49/046 310/105 |
| 6,956,311 B2 * | 10/2005 | Hosaka | ................. | H02K 29/08 310/156.43 |
| 7,148,596 B2 * | 12/2006 | Minato | .................. | H02K 53/00 310/152 |
| 7,977,841 B2 * | 7/2011 | Yang | ........................ | H02K 1/17 310/181 |
| 2016/0172947 A1 | 6/2016 | Kusakabe | | |

FOREIGN PATENT DOCUMENTS

JP    2009-118705 A    5/2009

* cited by examiner

*Primary Examiner* — Dang D Le
(74) *Attorney, Agent, or Firm* — Carrier Shende & Associates, P.C.; Joseph P. Carrier; Fulchand P. Shende

(57) ABSTRACT

A rotational motor includes a stator and a rotor and at least two magnets including a permanent magnet and an electromagnet, wherein one of the magnets is attached to the stator and one of the magnets is attached to the rotor. The magnets are relatively aligned such that when the electromagnet is switched off, the permanent magnet is attracted to a ferromagnetic core of the electromagnet causing the rotor to rotate relative to the stator, and when the electromagnet is switched on, the permanent magnet is repelled from the electromagnet causing the rotor to continue to rotate relative to the stator.

14 Claims, 12 Drawing Sheets

ROTATIONAL MOTOR

FIELD

The present invention relates to electrical engineering and, more particularly, to rotational electric motors.

BACKGROUND

Electric motors convert electrical energy into kinetic energy in the form of rotational motion. A direct current (DC) brushed electric motor typically comprises a spinning rotor or armature comprising an electromagnet. A pair of static metal brushes arranged next to respective sides of the rotor make contact with two spinning electrodes on the rotor and supply electricity to the electromagnet from a power source. The spinning rotor is disposed inside a stationary assembly, known as a stator of the motor, which commonly comprises a permanent magnet having a pair of magnetic poles.

When an electric current flows through the electromagnet, a magnetic field generated in the rotor attracts and repels, respectively, the two magnetic poles of the stator causing the rotor turn through 180 degrees. When the rotor rotates, each brush comes into contact with the opposite electrode. This causes the magnetic polarity of the electromagnet to flip which keeps the rotor spinning. Brushed electric motors have several problems. In particular, the brushes wear out over time, produce sparking and electrical noise during use and limit the maximum speed of the motor.

An improved DC electric motor comprises a brushless mechanism wherein permanent magnets are disposed on the rotor and electromagnets are disposed on the stator. A microcontroller circuit is used to switch the magnetic polarity of each electromagnet repeatedly as the rotor turns. Brushless motors of this configuration are generally more durable than brushed motors but still suffer from problems. In particular, because the magnetic polarity of each electromagnet must be flipped repeatedly, an electrical current must be supplied to each electromagnet continuously, which is not power efficient.

In this context, there is a need for improved rotational motors.

SUMMARY

According to the present invention, there is provided a rotational motor comprising:
a stator and a rotor; and
at least two magnets comprising a permanent magnet and an electromagnet, wherein one of the magnets is attached to the stator and one of the magnets is attached to the rotor and the magnets are relatively aligned such that:
when the electromagnet is switched off, the permanent magnet is attracted to a ferromagnetic core of the electromagnet causing the rotor to rotate relative to the stator; and
when the electromagnet is switched on, the permanent magnet is repelled from the electromagnet causing the rotor to continue to rotate relative to the stator.

The magnets may be relatively aligned such that when the electromagnet is switched on, like magnetic poles of the magnets are repelled from one another causing the rotor to rotate relative to the stator.

Each of the magnets may have an axis with opposite magnetic poles at opposed ends of the axis, wherein the magnets are relatively aligned such that the axis of a first of the magnets is diagonally aligned relative to the axis of a second of the magnets when a distance between the first and second magnets is at a minimum.

The electromagnet may comprise a collar surrounding the ferromagnetic core of the electromagnet at least in part, wherein the collar comprises a magnet adapted to increase a strength of a magnetic field produced in the ferromagnetic core by field windings of the electromagnet when an electric current flows through the field windings.

The magnet of the collar may be adapted such that the magnetic field produced in the ferromagnetic core is concentrated in a first section of the ferromagnetic core.

The first section of the ferromagnetic core may outwardly protrude from the collar and comprise the field windings of the electromagnet.

The collar may comprise an end portion that faces the first section of the ferromagnetic core, wherein the first section of the ferromagnetic core comprises first and second ends that are located, respectively, proximal to the end portion and distal to the end portion.

The collar and the ferromagnetic core may be relatively arranged such that a magnetic pole of a magnetic field of the collar at the end portion is opposite to a magnetic pole produced at the first end of the first section of the ferromagnetic core.

The ferromagnetic core may comprise a second section outwardly protruding from the collar in an opposed direction to the first section of the ferromagnetic core, wherein a magnetic shield covers the second section of the ferromagnetic core at least in part.

The magnetic shield may comprise a shroud comprised of a non-ferrous material substantially covering the second section of the ferromagnetic core.

The collar may comprise an annular magnet and the ferromagnetic core may be elongated and extend through an aperture of the annular magnet with the first and second sections of the ferromagnetic core outwardly protruding from the aperture.

The permanent magnet may be attached to the rotor and the electromagnet may be attached to the stator.

The electromagnet may be aligned relative to the rotor such that a longitudinal axis of the ferromagnetic core of the electromagnet is substantially parallel to a radius of a circular rotational path followed by the permanent magnet.

The rotor may comprise a flywheel rotatably supported by an engine block of the rotational motor.

The permanent magnet may comprise a Neodymium rare earth magnet.

The rotational motor may comprise a first plurality of permanent magnets attached to the rotor and a first plurality of electromagnets attached to the stator.

The rotational motor may comprise a plurality of motion sensors configured to detect rotational movement of the rotor and to switch the electromagnets on and off selectively to rotate the rotor.

The rotor may comprise a plurality of flaps arranged around the rotor, and the motion sensors may comprise infrared motion sensors configured to detect movement of the flaps.

The rotational motor may comprise a second plurality of permanent magnets attached to the rotor and a second plurality of electromagnets attached to the stator, wherein the rotational motor is configured such that when one or more of the first plurality of permanent magnets are attracted to one or more of the first plurality of electromagnets, one or more of the second plurality of permanent magnets are repelled from one or more of the second plurality of electromagnets, and vice versa.

The rotational motor may comprise a second rotor that is axially connected to, and rotates synchronously with, the rotor, wherein the second plurality of permanent magnets are attached to the second rotor.

BRIEF DESCRIPTION OF DRAWINGS

Embodiments of the invention will now be described by way of example only with reference to the accompanying drawings, in which.

DESCRIPTION OF EMBODIMENTS

Figure 1:
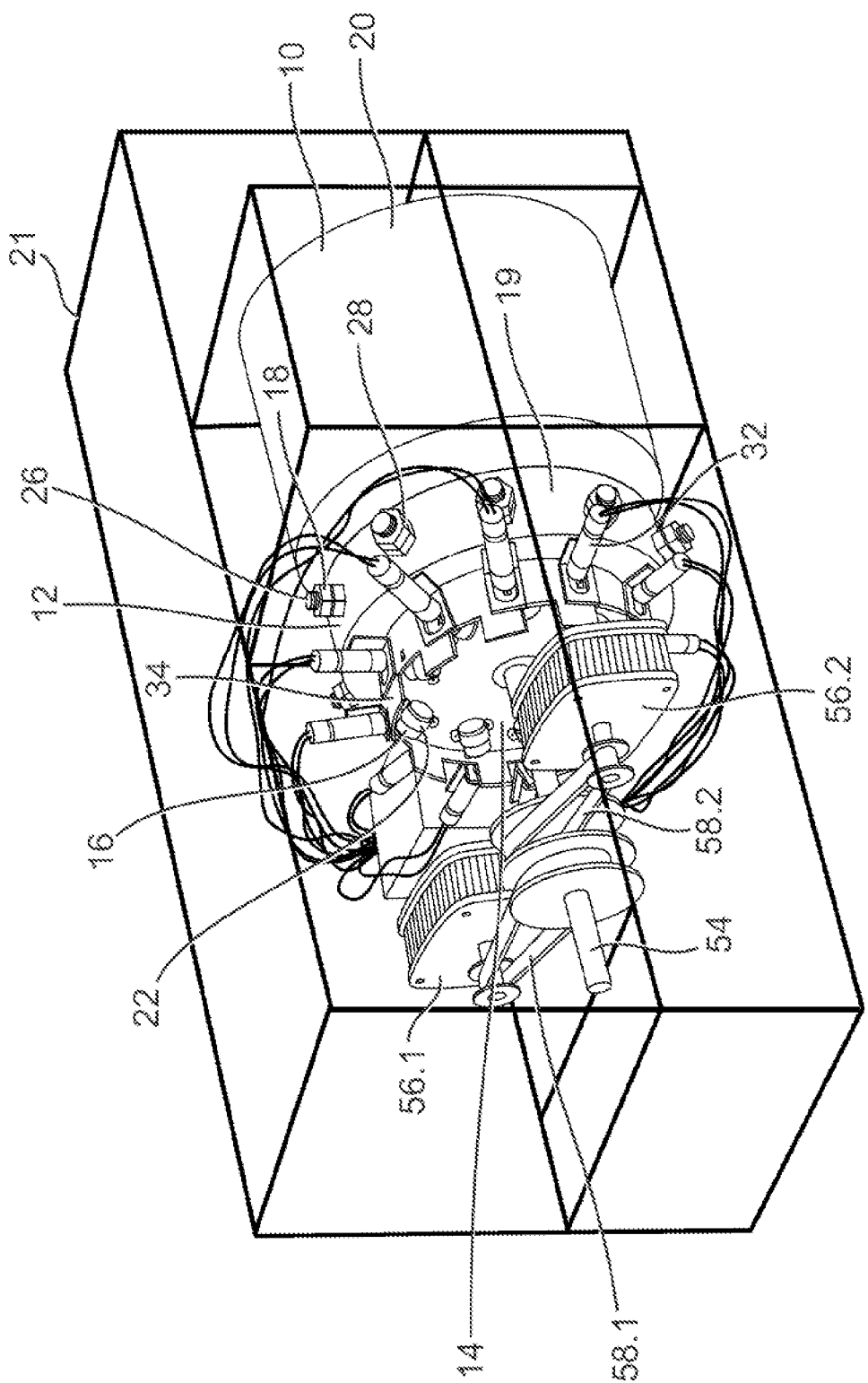
FIG. 1 is a perspective view of a rotational motor according to an example embodiment of the invention.

Referring to FIG. 1, an example embodiment of the present invention provides a rotational motor 10 that comprises a stator 12 and a rotor 14 and at least two magnets comprising a permanent magnet 16 and an electromagnet 18, wherein one of the magnets is attached to the stator 12 and one of the magnets is attached to the rotor 14. The magnets 16,18 are relatively aligned such that when the electromagnet 18 is switched off, the permanent magnet 16 is attracted to a ferromagnetic core of the electromagnet 18 causing the rotor 14 to rotate relative to the stator 12 and when the electromagnet 18 is switched on, the permanent magnet 16 is repelled from the electromagnet 18 causing the rotor 14 to continue to rotate relative to the stator 12.

More particularly, in the example depicted the stator 12 comprises a cylindrical housing 19 disposed at one end of an engine block 20 of the rotational motor 10. The engine block 20 is secured statically within a support assembly that comprises a frame 21. The engine block 20 and frame 21 may be made of a strong, resilient and, preferably, non-magnetic material such as fiberglass or a hard plastic-based material.

Figure 6:
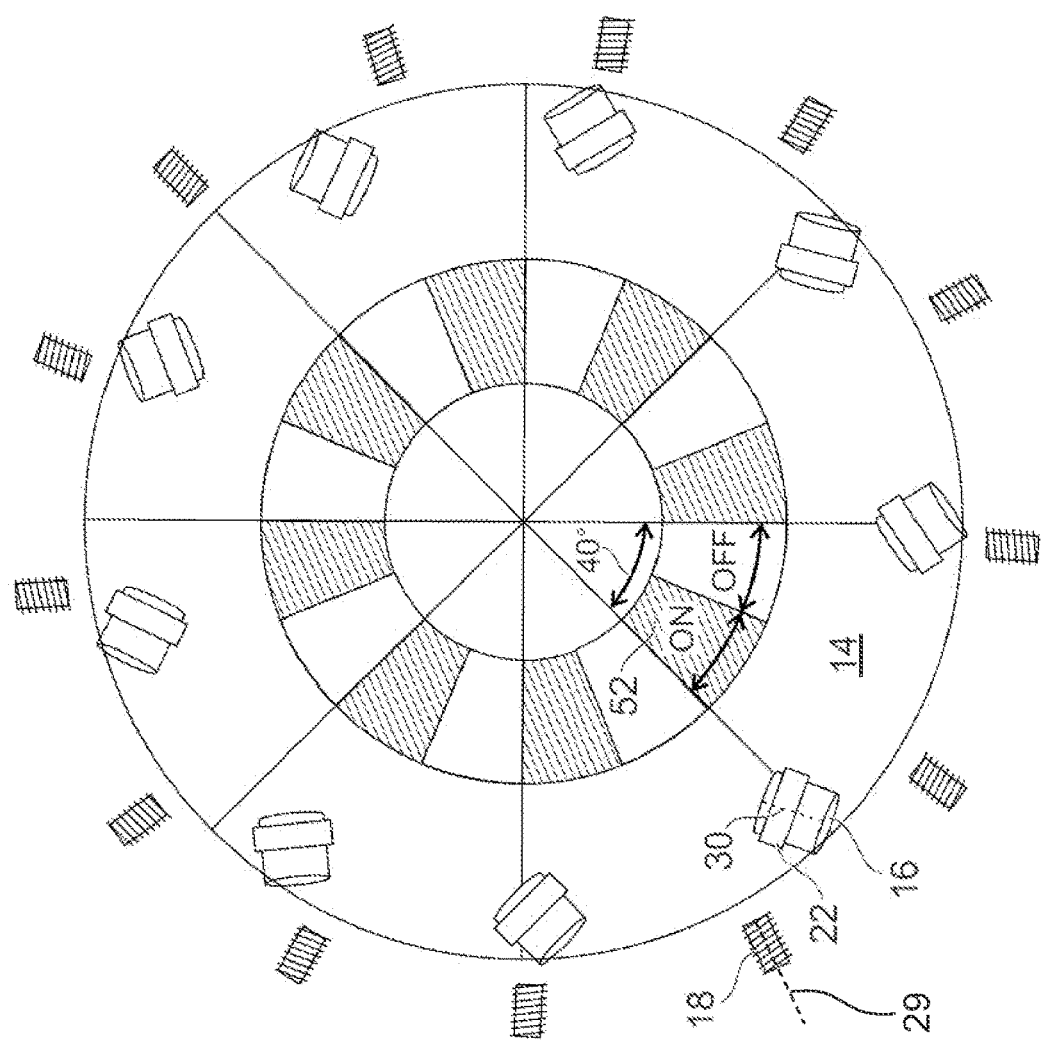
FIG. 6 is a schematic diagram of the flywheel showing a relative arrangement of permanent magnets and electromagnets of the rotational motor.

The rotor 14 may comprise a flywheel that is rotatably supported by the engine block 20. The flywheel 14 may comprise a circular disc having a plurality of permanent magnets 16 attached thereto. The permanent magnets 16 may be arranged proximal to an outer perimeter of the flywheel 14. In the example depicted, the flywheel 14 comprises a total of nine permanent magnets 16 disposed at regular spaced intervals around the outer perimeter. As shown in FIG. 6, in this arrangement a permanent magnet 16 is located every 40 degrees around the perimeter.

The permanent magnets 16 may comprise strong rare earth magnets, such as a Neodymium magnets, each having a cylindrical body. The cylindrical body may be attached to an outer-facing surface of the flywheel 14 using a saddle clamp 22 that is fixed onto the surface using a pair of screws or bolts. Each permanent magnet 16 may comprise north and south magnetic poles disposed at, respectively, opposed ends of a longitudinal axis of its cylindrical body. The weight of the permanent magnets 16 increases the angular momentum of the flywheel 14 when spinning during use.

Figure 2:
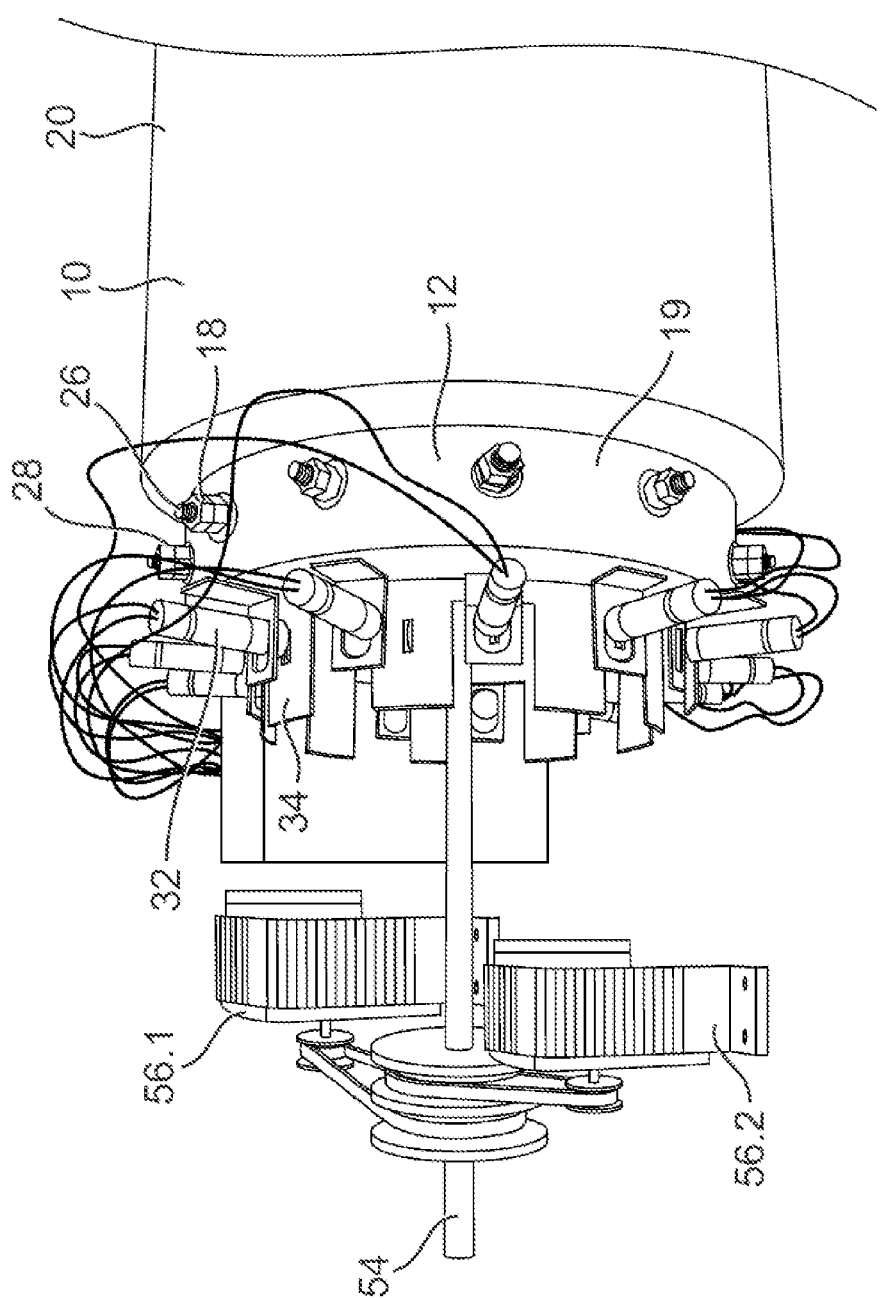
FIG. 2 is a side perspective view of an end section of an engine block of the rotational motor.
Figure 3:
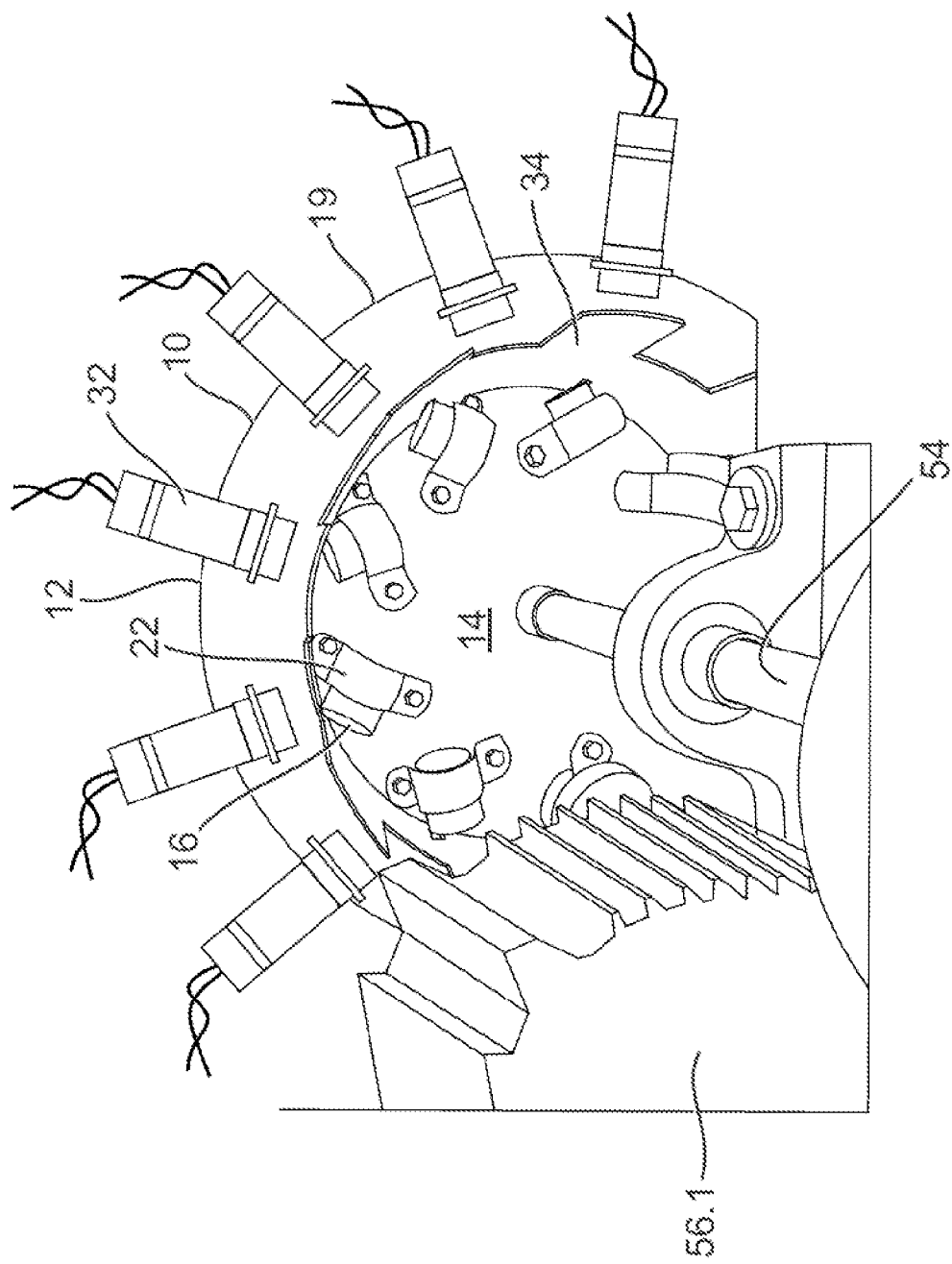
FIG. 3 is an enlarged perspective view of a flywheel of the rotational motor viewed from the end section.

Referring to FIG. 2, the motor 10 may also comprise a plurality of electromagnets 18 attached to the cylindrical housing 19. In the example depicted, the motor 10 comprises a total of thirteen electromagnets 18 that are regularly spaced around an outwardly facing perimeter of the cylindrical housing 19. The cylindrical housing 19 surrounds the perimeter of the flywheel 14 such that the permanent magnets 16 and electromagnets 18 are held in close proximity to one another as the flywheel 14 rotates.

The electromagnets 18 may each comprise an elongate core member with a field coil comprising a length of electrical wire wound around the core member. The core member may be comprised of a ferromagnetic material such as iron, amorphous or silicon steel or a ferrous ceramic material. The electromagnets 18 may each be attached to the cylindrical housing 19 using a bolt 26. The longitudinal axis of each bolt 26 may be aligned parallel with the longitudinal axis of the elongate core member of the relevant electromagnet 18 and extend from an end of the electromagnet 18 through the cylindrical housing 19. Each of the bolts 26 may comprise a threaded end portion outwardly protruding from the cylindrical housing 19 that threadedly receives a nut 28. Each of the bolts 26 may also comprise a pair of washers (not shown) that fit onto the bolt 26 such that they are held in abutting contact with respective innermost and outermost sides of the cylindrical housing 19 when the nut 28 is screwed down. Locking nuts (not shown) may also be threaded onto the bolts 26 underneath the nuts 28 to resist loosening of the nuts 28 caused by vibrations and torque during use.

The electromagnets 18 may be positioned relative to the permanent magnets 16 such that when the flywheel 14 is rotating, pairs of the magnets 16,18 become sufficiently close together such that they are able to influence one another. That is to say, the relevant pair of magnets 16,18 become sufficiently proximate such that when the electromagnet 18 is switched off, the permanent magnet 16 is attracted to the ferromagnetic core of the electromagnet 18, and when the electromagnet 18 is subsequently switched on, the permanent magnet 16 is then repelled from the electromagnet 18.

The ferromagnetic core of each electromagnet 18 may be elongated and define a longitudinal axis of the electromagnet 18. In this arrangement, north and south magnetic poles are produced at respective opposed ends of the axis when the electromagnet 18 is switched on. The magnets 16,18 may be relatively aligned such that when the distance between a pair of the magnets 16,18 is at a minimum, the axis of the cylindrical body of the permanent magnet 16 in the pair is diagonally aligned relative to the axis of the electromagnet 18. For example, referring to FIG. 6, the flywheel 14 is shown rotating clockwise and an individual permanent magnet labeled 16 is being attracted to, and is approaching, the core of an individual electromagnet labeled 18 that is switched off. Each of electromagnets 18 surrounding the flywheel 14 is oriented such that its longitudinal axis 29 is generally parallel to a radius of the flywheel 14. Further, each of the permanent magnets 16 is oriented on the flywheel 14 such that its longitudinal axis 30 is diagonally aligned relative to the radius of the flywheel 14. In this arrangement, when the distance between the two magnets 16,18 reaches a minimum, the two magnets 16,18 become adjacent to one another and their respective axes 29,30 become diagonally aligned relative to one another.

Further, when the distance between the pair of magnets 16,18 is at the minimum and the electromagnet 18 is switched on, like magnetic poles of the pair of magnets 16,18 face each other and opposite magnetic poles of the pair of magnets 16,18 face away from each other. For example, the magnets 16,18 may be aligned such that when the electromagnet 18 is switched on, the north magnetic pole of the electromagnet 18 faces the north magnetic pole of the permanent magnet 16 thus causing the permanent magnet 16 to be repelled from the north magnetic pole of the electromagnet 18. In another example, the magnets 16,18 may be aligned such that when the electromagnet 18 is switched on, the south magnetic pole of the electromagnet 18 faces the south magnetic pole of the permanent magnet 16 thus causing the permanent magnet 16 to be repelled from the south magnetic pole of the electromagnet 18. Because the axis 30 of the permanent magnet 16 is diagonally aligned relative to the axis 29 of the electromagnet 18, the repulsion force causes the flywheel 14 to continue to rotate.

The rotational motor 10 may also comprise a timing and control system for controlling when each of the electromagnets 18 is switched on and off. For example, the motor 10 may comprise a plurality of motion sensors, such as infrared motion sensors 32, positioned uniformly around the perimeter of the flywheel 14 at regular spaced intervals. Each of the infrared sensors 32 may be configured to detect rotational movement of the flywheel 14 and switch one of the electromagnets 18 on or off, as necessary, according to such detected movements.

To enable the infrared sensors 32 to detect movement of the flywheel 14 accurately, the flywheel 14 may comprise a plurality of flaps 34 arranged around its perimeter at regular spaced intervals. The flaps 34 may extend outwardly orthogonally from the face of the flywheel 14 in alignment with its rotational axis. The infrared sensors 32 may be oriented and positioned relative to the flywheel 14 such that they detect when the flaps 34 move into or past their field of vision one by one. The timing and control system uses the detected flap movements to determine the flywheel's 14 position and, therefore, when the electromagnets 18 each need to be switched on or off.

Figure 4:
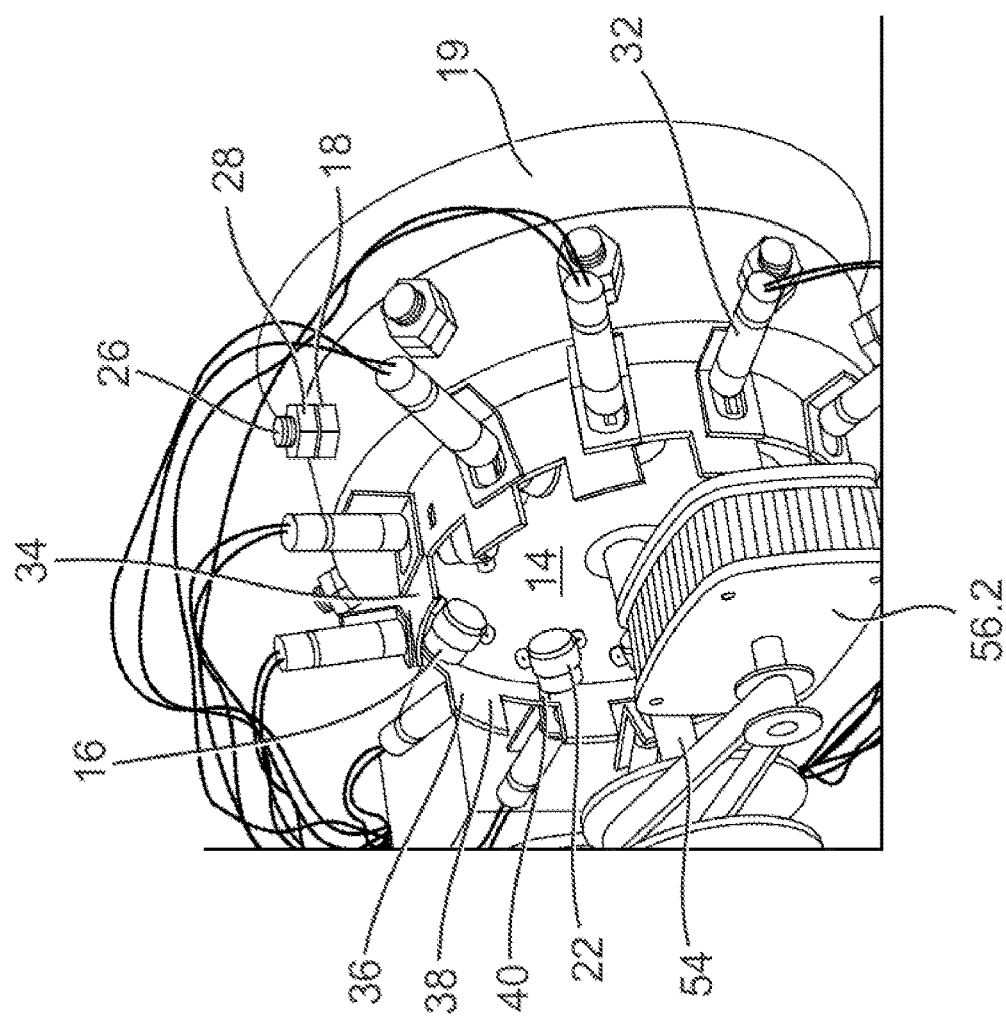
FIG. 4 is a further perspective view of the flywheel viewed from the end section.

Referring to FIG. 4, the flaps 34 may be connected to, or may be integrally formed with, a cylindrical carousel 36 that outwardly extends from the flywheel 14. An inwardly facing surface 38 of the carousel 36 may comprise a plurality of small rectangular apertures 40 formed in the surface 38. End corner portions of the permanent magnets 16 may protrude through the apertures 40, at least in part. This enables the permanent magnets 16 to be located in close proximity to the surrounding electromagnets 18.

Figure 5:
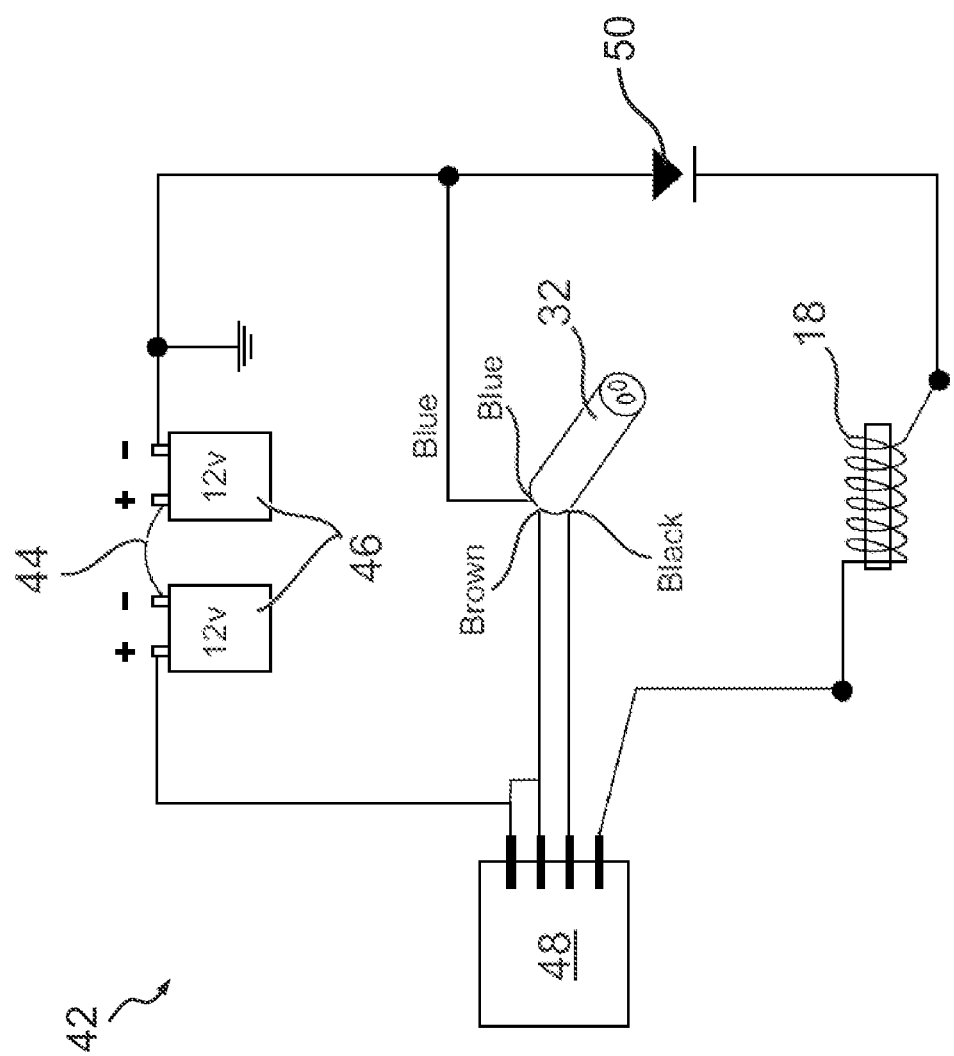
FIG. 5 is a schematic diagram of an electrical circuit comprising an individual infrared sensor and electromagnet of the rotational motor.

FIG. 5 provides a circuit diagram of an example circuit 42 that may be used in the timing and control system. The circuit 42 electronically connects an individual infrared motion sensor 32 to an individual electromagnet 18 used in the rotational motor 10. The circuit 42 comprises a power source 44 consisting of a pair of twelve volt (12V) batteries 46 arranged in series that supply electrical power to the infrared sensor 32. The positive and negative terminals of the power source 44 are connected to, respectively, the live (brown) and neutral (blue) lines of the infrared sensor 32.

The output load (black) line of the infrared sensor 32 may be connected to a relay 48, which is preferably a fifteen amp solid state relay 48. The electromagnet 18 is also connected to the batteries 46 via the relay 48. When the infrared sensor 32 detects movement of a flap 34 that requires the electromagnet 18 to be switched on, the switch of the relay 48 is closed causing an electrical current to flow through the electromagnet 18. When the infrared sensor 32 detects movement of a flap 34 that requires the electromagnet 18 to be switched off, the switch of the relay 48 is opened causing the electrical current to be shut off.

The circuit 42 also comprises a blocking diode 50 that is connected to the output terminal of the electromagnet 18. The blocking diode 50 enables the electromagnet 18 to be isolated rapidly and, therefore, reduces the amount of time taken for the magnetic field in the electromagnet 18 to dissipate when the electromagnet 18 is switched off.

The rotational motor 10 may comprise a plurality of the timing control circuits 42 which, together, connect each of the infrared motion sensors 32 to each of the electromagnets 18 used in the motor 10. The relays 48 of the timing control circuits 42 may be housed inside a soundproof box to reduce noise emitted by the relays 48 during use. The circuits 42 may comprise alternative switch devices to the relays 48, such as transistors. In other examples, the rotational motor 10 may comprise a digital electronic control system, such as a microprocessor, programmable logic controller (PLC) or programmable logic array (PLA), configured to implement the timing and switching functionality performed by the timing control circuits 42.

In use, when each individual electromagnet 18 is switched off by the timing and control system, a permanent magnet 16 on the flywheel 14 that is located closest to the relevant electromagnet 18 is attracted to the ferromagnetic core member of the electromagnet 18. This causes the flywheel 14 to rotate until the relevant permanent magnet 16 is located adjacent to the relevant electromagnet 18 and the distance between the two magnets 16,18 is at a minimum. The relevant electromagnet 18 is then switched on by the timing and control system. This causes a magnetic field to be produced by the electromagnet 18 with north and south magnetic poles formed at opposed ends of the axis of the electromagnet 18. The permanent magnet 16 is oriented such that, when adjacent to the electromagnet 18, its longitudinal axis is diagonally aligned relative to the axis of the electromagnet 18. Further, the magnetic pole located at the outermost end of the longitudinal axis of the permanent magnet 16 matches the magnetic pole formed at the end of the electromagnet 18 that faces the permanent magnet 16. The permanent magnet 16 is, therefore, repelled from the electromagnet 18 causing the flywheel 14 to continue to rotate. The plurality of electromagnets 18 are switched on and off in an alternating pattern accordingly by the timing and control system thus causing the flywheel 14 to rotate continuously.

The rotational motor 10 may be configured such that the repulsion forces experienced between the permanent magnets 16 and electromagnets 18 are approximately double the attraction forces experienced between them as the flywheel 14 rotates. Further, as illustrated by the shaded regions labeled 52 in FIG. 6, each of the electromagnets 18 may be switched on and off at a frequency that provides that the permanent magnets 16 are attracted to the electromagnets 18 for substantially the same amount of time as which they are repelled from one another. This process ensures that the rotational motion produced by the flywheel 14 is smooth and continuous. To control the rotational velocity of the flywheel 14, the electrical power that is supplied to the electromagnets 18, and the frequency at which the electromagnets 18 are switched on and off, may be varied as required.

To operate the rotational motor 10, each electromagnet 18 only needs to be switched on for periodic intervals during each rotation of the flywheel 14. That is to say, each electromagnet 18 is only switched on when it is repelling one of the permanent magnets 16. Therefore, in contrast to existing brushless motors, an electric current does not need to be supplied to each electromagnet 18 continuously. The rotational motor 10 is, therefore, advantageously power efficient.

In the example depicted, the permanent magnets 16 are attached to the flywheel 14 and the electromagnets 18 are attached to the stator 12 of the motor 10. However, in other examples the permanent magnets 16 may, instead, be attached to the stator 12 (for example, attached to the cylindrical housing 19) and the electromagnets 18 may, accordingly, be attached to the flywheel 14.

Further, in other examples, to increase a rotational torque produced by the motor 10, the motor 10 may comprise a second plurality of electromagnets (not shown) and a second plurality of permanent magnets (not shown) attached to the stator 12 and flywheel 14 in a relative arrangement. In such examples, when one or more of the first plurality of permanent magnets 16 are being attracted to one or more of the first plurality of electromagnets 18, one or more of the second plurality of permanent magnets may be repelled from one or more of the second plurality of electromagnets, and vice versa.

The second plurality of electromagnets may be attached to the cylindrical housing 19 that surrounds the flywheel 14 and the second plurality of permanent magnets may be attached to the flywheel 14. For example, the second plurality of permanent magnets may be interleaved between the first plurality of permanent magnets 16. Alternatively, the second plurality of permanent magnets may be attached at positions on the flywheel 14 that are located closer towards a centre of the flywheel 14 than the first set of permanent magnets 16. In other examples, the motor 10 may comprise a second rotor or flywheel (not shown) that is axially connected to, and rotates synchronously with, the first rotor or flywheel 14. The second plurality of permanent magnets may be attached to the second flywheel.

The rotational motion produced by the flywheel 14 of the motor 10 may be used to generate electrical power. For example, the flywheel 14 may also comprise a drive shaft 54 axially aligned with a rotational axis of the flywheel 14. The motor 10 may comprise one or more electric generators 56 configured to convert rotational motion of the drive shaft 54 into an electrical current. In the example depicted in FIG. 1, the motor 10 comprises two electric generators 56. Two drive belts 58 are provided for transferring rotational motion from the drive shaft 54 to each of the electric generators 56.

The electrical current that is produced using the electric generators 56 may be used, in part, to help power the electromagnets 18. The electrical current may be supplied directly to each of the electromagnets 18, as determined by a control system of the rotational motor 10. In other examples, the electrical current may be supplied to the batteries 46 so that the batteries 46 are charged continuously while the motor 10 runs during use.

The motor 10 may also comprise a means for restoring the permanent magnets 16 should their magnetism deplete over time. For example, the permanent magnets 16 may be provided with wire coils (not shown) through which electrical power may be supplied periodically when the motor 10 is not in use to induce and restore their magnetic power. In other examples, the permanent magnets 16 may be periodically detached from the flywheel 14 and placed into a remagnetizing apparatus (not shown) that is separate to the motor 10. The remagnetizing apparatus may, for example, comprise a series of permanent magnets or electromagnets that may be moved over surfaces of the permanent magnets 16 in a reciprocating manner using a mechanical assembly. This process may realign electrons that have fallen out of sync with other polarized electrons in the permanent magnets 16 to restore their magnetism.

Figure 7:
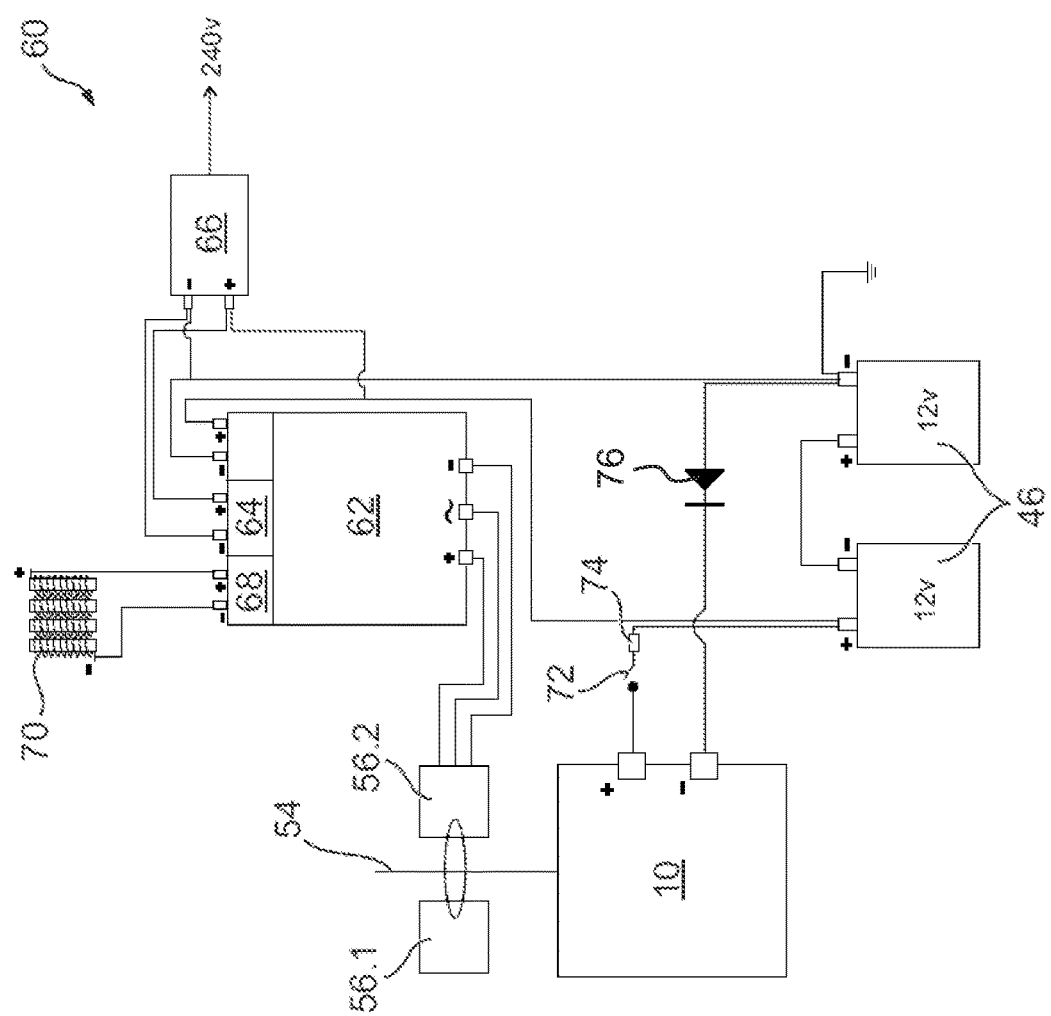
FIG. 7 is a schematic diagram of an electrical circuit that comprises an inverter and a controller for an electric generator that is connectable to the rotational motor.

Referring to FIG. 7, there is provided a master circuit 60 that may be used to regulate and manage the power produced using the electric generators 56 of the motor 10. The master circuit 60 may comprise a controller 62 which receives direct electrical current (DC) from the two batteries 46 that are used to power the timing control circuits 42. The controller 62 may also receive alternating electrical current (AC) produced by the electric generators 56. The controller 62 may comprise a DC load output 64 that supplies electrical current to an inverter 66 and a dump DC output 68 that supplies any power produced in excess of the level that the inverter 66 may receive or require to one or more dump load resistors 70. The inverter 66 may be configured to convert and transform 24 volts of electricity received from the controller 62 into a 240 volt output for supplying electrical power to a domestic electricity supply or an electrical grid supply network. The master circuit 60 may also comprise a switch 72 provided with a fuse 74 for turning the motor 10 on and off and a diode 76 for protecting the motor 10.

Figure 8:
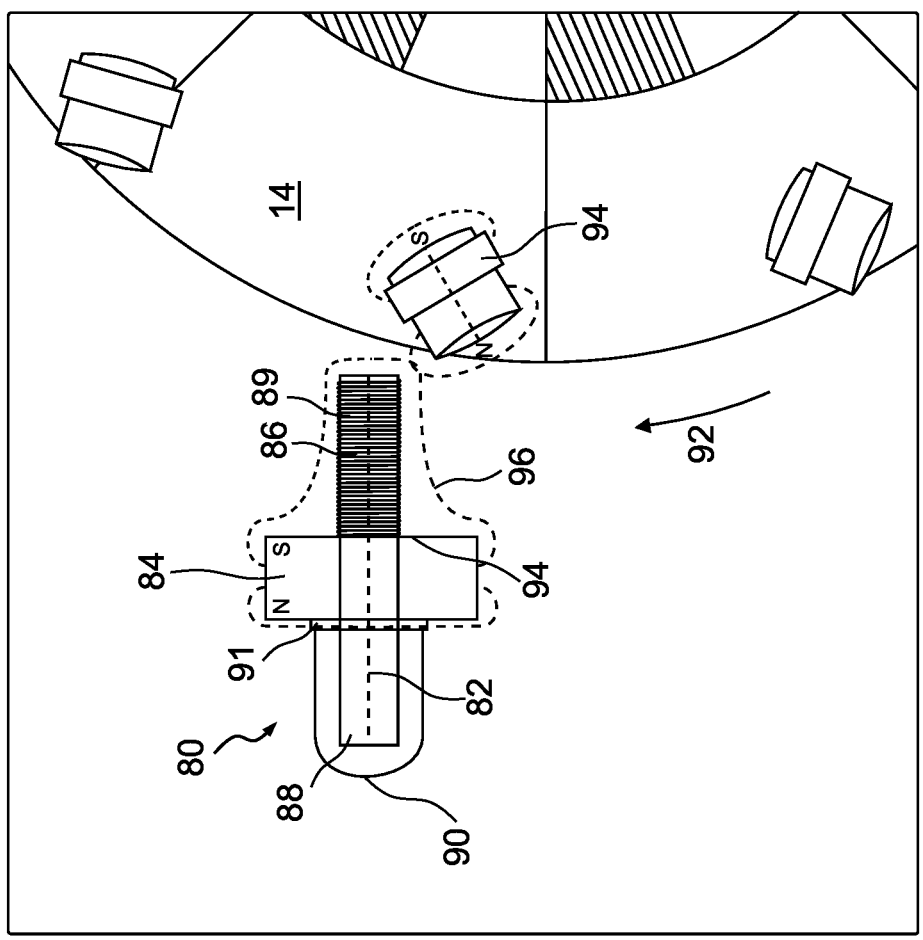
FIG. 8 is a schematic diagram of a side portion of the flywheel arranged next to an individual electromagnet that may be used in example embodiments of the invention.
Figure 9:
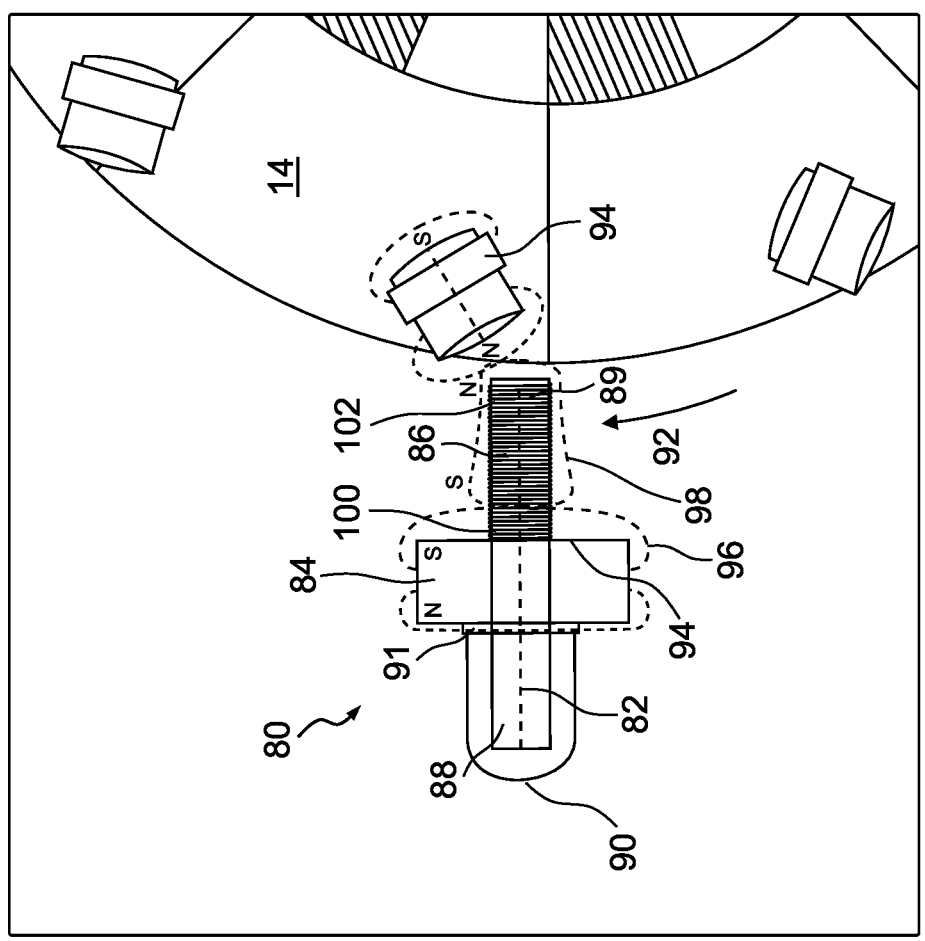
FIG. 9 is a further schematic diagram of the side portion of the flywheel.

Referring to FIGS. 8 and 9, there is provided a further example of an individual electromagnet 80 that may be comprised in the rotational motor 10. The electromagnet 80 is shown arranged next to the flywheel 14 of the rotational motor 10. The electromagnet 80 may comprise an elongate core 82 comprised of a ferromagnetic material, such as iron, having a longitudinal axis extending therethrough. The core 82 may be surrounded, at least in part, by a collar 84 that comprises an annular magnet. The core 82 may extend through an aperture of the annular magnet 84 such that first and second elongate sections 86, 88 of the core 82 outwardly protrude from the aperture in opposed directions. Field windings 89 of the electromagnet 80 may be coiled around the first section 86.

The annular magnet 84 may be adapted to increase the strength of a magnetic field produced in the ferromagnetic core 82 when the electromagnet 80 is switched on and current is flowing through its field windings 89. More particularly, the annular magnet 84 may generate a magnetic field having field vector characteristics that cause the magnetic field produced in the core 82 to be concentrated in its first section 86. A magnetic shield 90 may cover the second section 88 of the core 82 at least in part. The magnetic shield 90 may comprise a generally cylindrical or capsule-shaped shroud comprised of a non-ferrous material, such as aluminium, copper or an alloy such as brass, that substantially covers the second section 88. The shroud 90 may have an internal screw thread that threadedly receives a complimentary screw thread provided around the outermost cylindrical surface of the second section 88 such that the shroud 90 may be screwed thereon. The second section 88 may also be provided with a washer 91 positioned between the shroud 90 and collar 84.

The flywheel 14 is shown rotating in a clockwise direction, as indicated by the arrow labeled 92. In FIG. 8, the electromagnet 80 is switched off and an individual permanent magnet 94 attached to the flywheel 14 is in close proximity to the electromagnet 80. The permanent magnet 94 is, therefore, being attracted to the ferromagnetic core 82 of the electromagnet 80. In the example depicted, the collar 84 comprises an annular permanent Neodymium rare earth magnet having a north and a south magnetic pole. The collar 84 is arranged over the core 82 such that its southern magnetic pole is located proximal to an end portion 94 of the collar 84 that faces, and abuts, the first section 86 of the core 82. The magnetic field of the collar 84, which is indicated generally using broken line labeled 96, extends substantially over and around the first section 86 of the core 82. The permanent magnet 94 on the flywheel 14 is orientated such that its northern magnetic pole faces outwardly from the flywheel 14. The permanent magnet 94 is also, therefore, interacting with the magnetic field 96 of the collar 84 and is being attracted to the southern magnetic pole of the collar 84.

In FIG. 9, the electromagnet 80 is switched on and an electric current is flowing through its field windings 89 around the first section 86 of the core 82. A magnetic field is, therefore, being generated by the electromagnet 80 around the first section 86, which is indicated generally using the broken line labeled 98. The current flowing through the field windings 89 causes a southern magnetic pole to be formed towards a first end 100 of the first section 86 that is proximal to the collar 84. A northern magnetic pole is formed towards a second end 102 that is distal to the collar 84.

As illustrated in FIG. 9, the southern magnetic pole of the collar 84 located at the end portion 94 of the collar 84 causes the generated magnetic field 98 to be compressed such that its lines of flux are concentrated around the first section 86 of the core 82. Further, the magnetic field 96 of the collar 84 is distorted by the generated magnetic field 98 such that it no longer extends around the first core section 86. This amplifies the strength of the generated magnetic field 98. Further, the magnetic shield 90 substantially isolates and prevents the two magnetic fields 96,98 from extending around the second section 88 of the ferromagnetic core 82. This further amplifies the strength of the magnetic field 98 generated at the first core section 86.

The northern magnetic pole that is formed towards the second end 102 of the first core section 86 causes the permanent magnet 94 to be repelled from the electromagnet 80. This causes the flywheel 14 to continue to rotate in a clockwise direction. The collar 84 and magnetic shield 90, therefore, advantageously increase the relative attraction and repulsion forces experienced between the electromagnet 80 and permanent magnet 94. This, in turn, increases the torque exerted on the flywheel 14.

Figure 10:
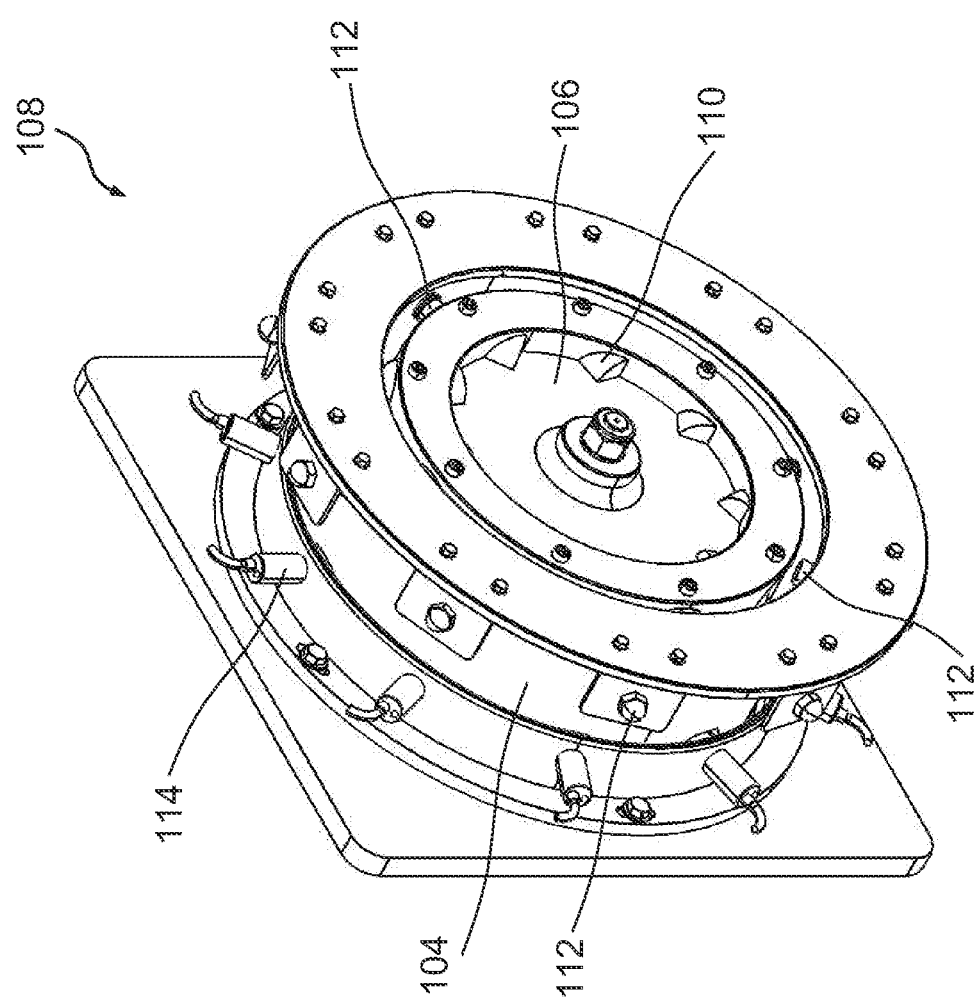
FIG. 10 is a perspective view of a flywheel and stator assembly of a rotational motor according to a further example embodiment of the invention.
Figure 11:
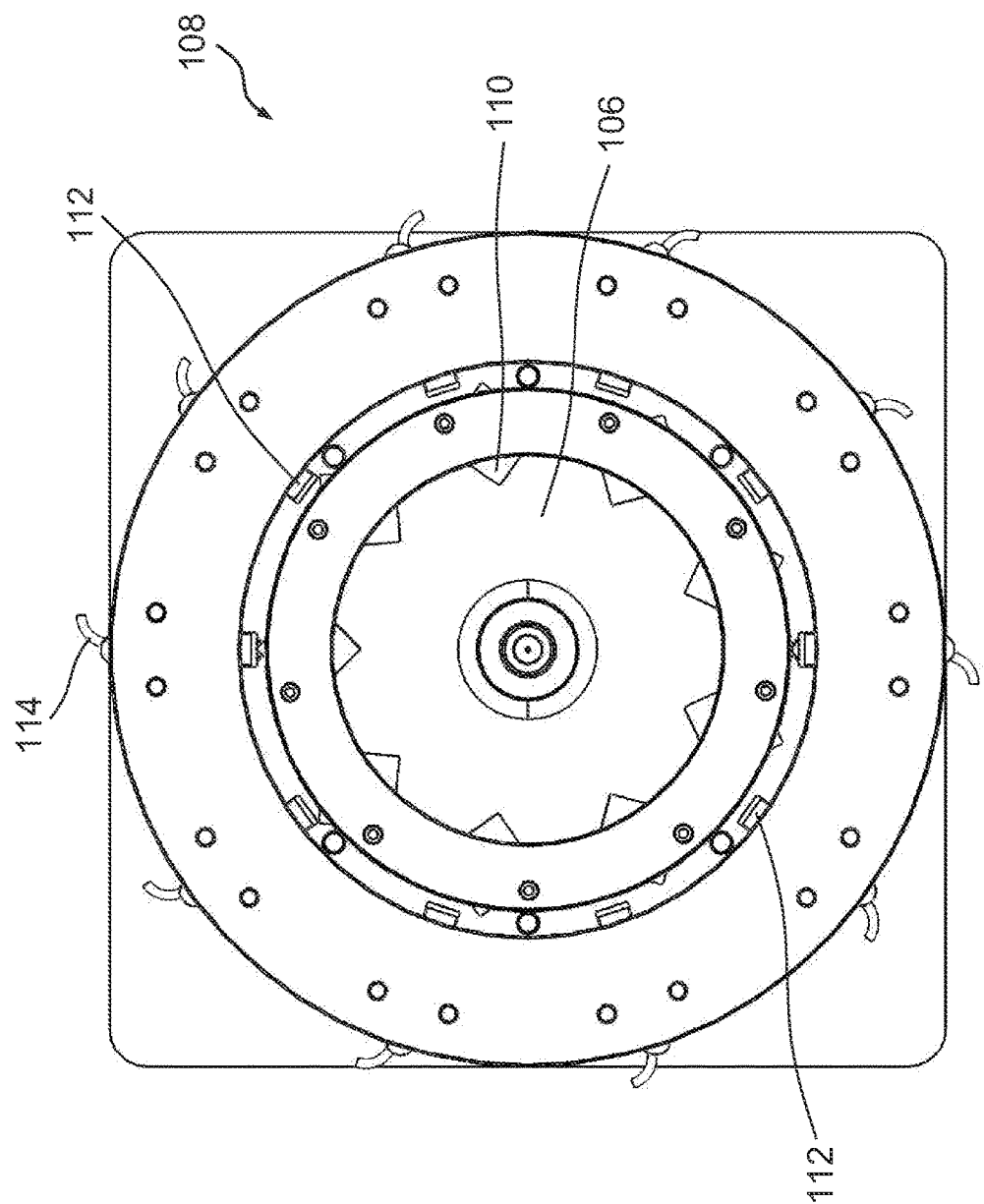
FIG. 11 is a front view of the flywheel and stator assembly in FIG. 10.

It will be appreciated that the relative arrangement and configuration of the stator 12, rotor 14, motion sensors 32, flaps 34, permanent magnets 16 and electromagnets 18 of the rotational motor 10 is not limited to the examples depicted in FIGS. 1 to 6. For example, referring to FIGS. 10 to 12, there is provided a stator 104 and rotor 106 of a rotational motor 108 according to a further example embodiment of the invention. The rotor 106 comprises a flywheel and the stator 104 comprises a cylindrical housing, wherein the flywheel 106 is contained inside, and is rotatable supported by, the housing 104. A total of nine permanent magnets 110 are arranged at regular spaced intervals around an outer perimeter of the flywheel 106.

Figure 12:
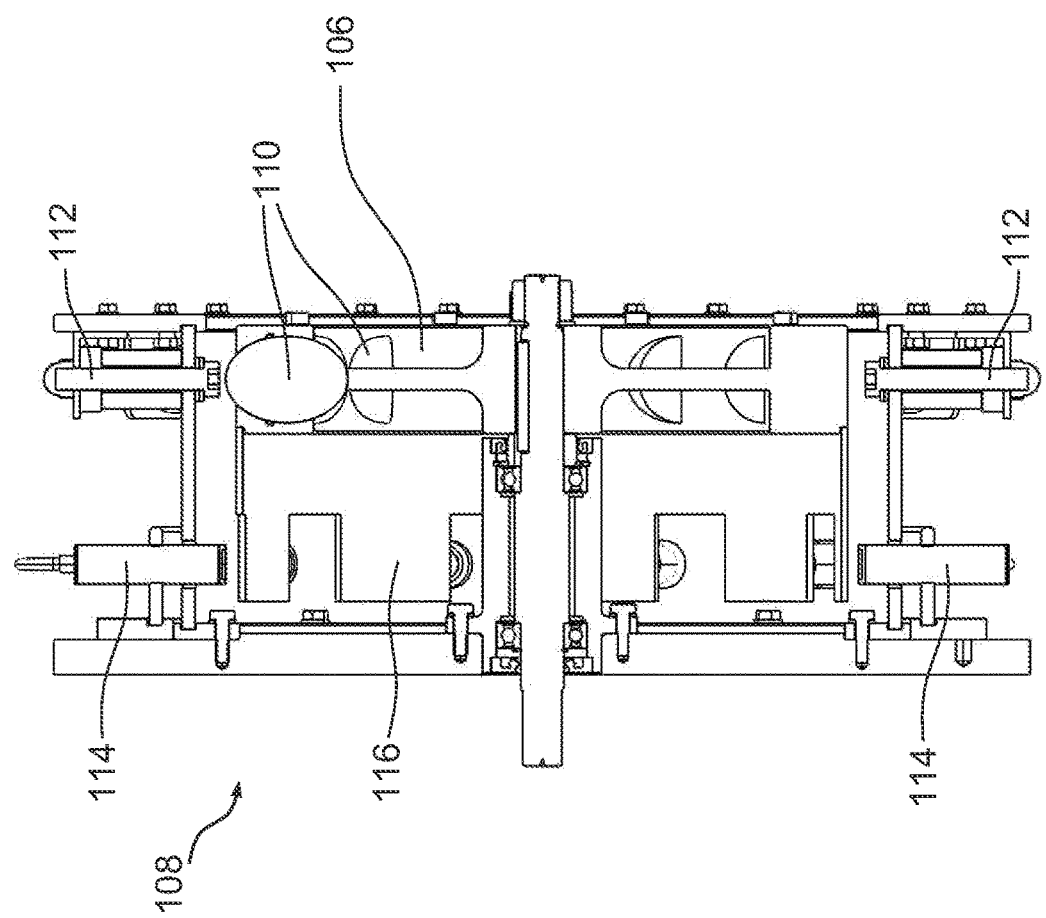
FIG. 12 is a cross sectional side view of the flywheel and stator assembly in FIG. 10.

A total of ten electromagnets 112 are attached to a frontmost section of the cylindrical housing 104 at regular spaced intervals around its circumference such that the electromagnets 112 surround the permanent magnets 110 in close proximity. A total of ten motion sensors 114 are attached to a rearmost section of the housing 104 at regular spaced intervals around its circumference. The motion sensors 114 protrude through the housing 104 inwardly extending into its hollow interior. As best shown in FIG. 12, the flywheel 106 comprises a plurality of flaps 116 rearwardly extending from the flywheel 106 into the hollow interior of the housing 104.

The rotational motor 108 embodies the same operating principles as the example motor 10 depicted in FIGS. 1 to 6. The permanent magnets 110 and electromagnets 112 and relatively aligned such that when each of electromagnets 112 is switched off, a permanent magnet 110 on the flywheel 106 that is closest to the relevant electromagnet 112 is attracted to a ferromagnetic core of the electromagnet 112 causing the flywheel 106 to rotate. When the relevant electromagnet 112 is subsequently switched on, the relevant permanent magnet 110 is then repelled from the electromagnet 112 causing the flywheel 106 to continue to rotate. The motion sensors 114 may comprise infrared motion sensors that detect relative motion between the flaps 116 and the sensors 114. The rotational motor 108 may comprise an electronic timing and control system that uses motion detected by the infrared sensors 114 to determine when each of the electromagnets 112 is switched on and off to produce continuous, smooth rotation of the flywheel 106.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. A rotational motor comprising:
   a stator and a rotor;
   at least two magnets comprising a permanent magnet and an electromagnet, wherein one of the magnets is attached to the stator and one of the magnets is attached to the rotor;
   an annular magnetic collar surrounding an elongate ferromagnetic core of the electromagnet at least in part, wherein first and second core sections of the ferromagnetic core outwardly protrude from the magnetic collar in opposed directions, the magnetic collar comprising opposed first and second end portions that face, respectively, the first and second core sections;
   field windings coiled around the first core section such that an electric current flowing through the field windings causes a magnetic field to be created around the first core section, wherein the magnetic field comprises a first magnetic pole produced at an end of the first core section proximal to the magnetic collar and a second magnetic pole produced at an end of the first core section distal to the magnetic collar; and
   a magnetic shield that substantially covers the second core section,
   wherein the magnetic collar is oriented relative to the ferromagnetic core such that a magnetic pole at the first end portion of the magnetic collar is opposite in polarity to the first magnetic pole, such that the magnetic collar concentrates and increases a strength of the magnetic field created around the first core section; and the magnets are relatively aligned such that when the electromagnet is switched off the permanent magnet is attracted to the ferromagnetic core causing the rotor to rotate relative to the stator, and when the electromagnet is switched on the permanent magnet is repelled from the magnetic field created around the first core section causing the rotor to continue to rotate relative to the stator.

2. The rotational motor according to claim 1, wherein the magnetic shield comprises a capsule-shaped shroud.

3. The rotational motor according to claim 1, wherein:
each of the magnets has an axis with opposite magnetic poles at opposed ends of the axis; and
the magnets are relatively aligned such that the axis of a first of the magnets is diagonally aligned relative to the axis of a second of the magnets when a distance between the first and second magnets is at a minimum.

4. The rotational motor according to claim 3, wherein the rotational motor is configured such that the electromagnet is only switched on when the distance between the first and second magnets is at a minimum.

5. The rotational motor according to claim 1, wherein the permanent magnet is attached to the rotor and the electromagnet is attached to the stator.

6. The rotational motor according to claim 5, wherein the electromagnet is aligned relative to the rotor such that a longitudinal axis of the ferromagnetic core of the electromagnet is substantially parallel to a radius of a circular rotational path followed by the permanent magnet.

7. The rotational motor according to claim 5, wherein the rotational motor comprises a first plurality of permanent magnets attached to the rotor and a first plurality of electromagnets attached to the stator.

8. The rotational motor according to claim 7, wherein the rotational motor comprises a plurality of motion sensors configured to detect rotational movement of the rotor and to switch the electromagnets on and off selectively to rotate the rotor.

9. The rotational motor according to claim 8, wherein the rotor comprises a plurality of flaps arranged around the rotor, and the motion sensors comprise infrared motion sensors configured to detect movement of the flaps.

10. The rotational motor according to claim 9, wherein the motion sensors comprise infrared motion sensors.

11. The rotational motor according to claim 7, wherein:
the rotational motor comprises a second plurality of permanent magnets attached to the rotor and a second plurality of electromagnets attached to the stator; and
when one or more of the first plurality of permanent magnets are attracted to one or more of the first plurality of electromagnets, one or more of the second plurality of permanent magnets are repelled from one or more of the second plurality of electromagnets, and vice versa.

12. The rotational motor according to claim 11, wherein the second plurality of permanent magnets are arranged on the rotor such that they are interleaved between the first plurality of permanent magnets.

13. The rotational motor according to claim 1, wherein the permanent magnet comprises a Neodymium rare earth magnet.

14. The rotational motor according to claim 1, wherein the rotor comprises a flywheel rotatably supported by an engine block of the rotational motor.

* * * * *